United States Patent
Kameyama et al.

(10) Patent No.: US 8,567,790 B2
(45) Date of Patent: Oct. 29, 2013

(54) SEALING STRUCTURE USING METAL GASKET

(75) Inventors: Takuma Kameyama, Shizuoka (JP); Takanobu Suzuki, Shizuoka (JP); Hiroyuki Matsumoto, Kumagaya (JP)

(73) Assignees: Yamaha Hatsudoki Kabushiki Kaisha, Shizuoka (JP); Japan Metal Gasket Co., Ltd., Saitama (JP)

( * ) Notice: Subject to any disclaimer, the term of this patent is extended or adjusted under 35 U.S.C. 154(b) by 225 days.

(21) Appl. No.: 13/038,559

(22) Filed: Mar. 2, 2011

(65) Prior Publication Data

US 2011/0181001 A1 Jul. 28, 2011

Related U.S. Application Data

(62) Division of application No. 11/828,160, filed on Jul. 25, 2007, now abandoned.

(30) Foreign Application Priority Data

Jul. 26, 2006 (JP) ................................. 2006-203824

(51) Int. Cl.
*F02F 11/00* (2006.01)
(52) U.S. Cl.
USPC ........................................... 277/594; 277/595
(58) Field of Classification Search
USPC .............................. 277/591–598; 123/195 R
See application file for complete search history.

(56) References Cited

U.S. PATENT DOCUMENTS

| | | | | |
|---|---|---|---|---|
| 5,058,908 A * | 10/1991 | Udagawa | ........................ | 277/595 |
| 5,161,809 A * | 11/1992 | Matsushita et al. | ............ | 277/601 |
| 5,584,490 A * | 12/1996 | Inoue et al. | .................... | 277/595 |
| 5,664,790 A * | 9/1997 | Tanaka et al. | .................. | 277/595 |
| 5,690,343 A * | 11/1997 | Takada et al. | .................. | 277/595 |
| 5,700,016 A * | 12/1997 | Miyaoh et al. | ................. | 277/591 |
| 5,879,011 A * | 3/1999 | Takata et al. | ................... | 277/593 |
| 5,988,650 A * | 11/1999 | Plunkett | ......................... | 277/593 |
| 6,142,482 A | 11/2000 | Goto et al. | | |
| 6,164,662 A * | 12/2000 | Uemura et al. | ................. | 277/593 |
| 6,283,480 B1 * | 9/2001 | Miura et al. | ................... | 277/593 |
| 6,550,782 B2 * | 4/2003 | Okazaki et al. | ................ | 277/592 |
| 7,044,098 B2 * | 5/2006 | Amano et al. | ............. | 123/195 R |
| 7,377,520 B2 * | 5/2008 | Imai | ............................... | 277/594 |

FOREIGN PATENT DOCUMENTS

| | | |
|---|---|---|
| JP | 04-071865 U | 6/1992 |
| JP | 10-110827 A | 4/1998 |
| JP | 2002-013640 A | 1/2002 |

OTHER PUBLICATIONS

Kameyama et al.; "Sealing Structure Using Metal Gasket"; U.S. Appl. No. 11/828,160, filed Jul. 25, 2007.

* cited by examiner

*Primary Examiner* — Vishal Patel

(74) *Attorney, Agent, or Firm* — Keating & Bennett, LLP (57) ABSTRACT

A metal gasket has a primary bead formed on an area positioned between a cylinder bore and a cooling water passage. A second bead is formed on an area corresponding to an opening of one or more cooling passages. A base member of the metal gasket comprises bead plates that have a rubber coating layer. The base member also comprises a shim member disposed between the bead plates. The primary bead is formed by defining a space respectively between the bead plates and the shim member. The secondary bead is formed by defining a space on a given area between the bead plates.

10 Claims, 14 Drawing Sheets

SEALING STRUCTURE USING METAL GASKET

CROSS-REFERENCE TO RELATED APPLICATIONS

This application claims the priority benefit of Japanese Patent Application No. 2006-203824, filed Jul. 26, 2006, which is hereby incorporated by reference in its entirety.

BACKGROUND OF THE INVENTION

1. Field of the Invention

The present invention generally relates to a sealing structure using a metal gasket designed to seal a mating face of an engine body. More particularly, the present invention relates to such a seal that can be positioned between an assembled cylinder and cylinder body combination.

2. Description of the Related Art

An engine body of an engine used in small watercraft typically comprises multiple case members or components that are secured together to define at least a portion of the engine. Two of those components are the cylinder head and the cylinder body. The cylinder head and the cylinder body are joined together at a mating face. A sealing structure can be provided at the mating face to reduce the likelihood that coolant or cooling water will enter into the combustion system (See JP-A-2005-325885, for example).

The sealing structure can comprise a metal gasket that is positioned along the mating surfaces of the cylinder head and the cylinder body. The metal gasket can be made from a stainless thin-plate base member with a rubber layer formed on its surface. The metal gasket also can have a protruding bead that is formed on an area along a periphery of a cooling water passage. The protruding bead is pressed between the cylinder head and the cylinder body such that a tight seal around the cooling water passage can be formed by the protruding bead. Thus, cooling water is less likely to seep from the cooling water passage into the combustion system or the like.

SUMMARY OF THE INVENTION

However, in the aforementioned sealing structure, the bead is not positioned very close to the cooling water passage. In addition, the beam may actually cause the cylinder head and the cylinder body to be spaced apart ever so slightly in the region of the cooling water passage. Thus, in some situations, coolant or cooling water can seep into the space between defined among the cylinder head, the cylinder body, the cooling water passage and the bead. In such situations, particularly when seawater is used as the coolant, corrosion may occur on the mating face between the cylinder head and the cylinder body.

Thus, in accordance with one aspect of the present invention, a sealing structure is formed that uses a metal gasket to inhibit corrosion of mating surfaces of the cylinder head and the cylinder body, for instance, by reducing the likelihood of cooling water entering the region defined between the mating surfaces.

Thus, in accordance with one aspect of an embodiment of the present invention, a metal gasket is provided that is adapted to seal an interface between a cylinder head and a cylinder body of an engine body. The metal gasket comprises cylinder openings and at least one cooling water passage that is positioned in the vicinity of at least one of the cylinder openings. The metal gasket further comprises a primary bead that protrudes toward at least one of the cylinder head and the cylinder body. The primary bead is positioned between at least one of the cylinder openings and one of the at least one cooling water passages. The metal gasket also comprises a secondary bead that protrudes toward at least one of the cylinder head and the cylinder body. The secondary bead is positioned between the primary bead and the at least one cooling water passage such that cooling water is less likely to enter a region defined between the cylinder head and the cylinder body.

BRIEF DESCRIPTION OF THE DRAWINGS

These and other features, aspects and advantages of embodiments of the present invention will be described below with reference to the attached drawings. The drawings comprise the following figures.

DETAILED DESCRIPTION OF THE PREFERRED EMBODIMENT

Figure 1:
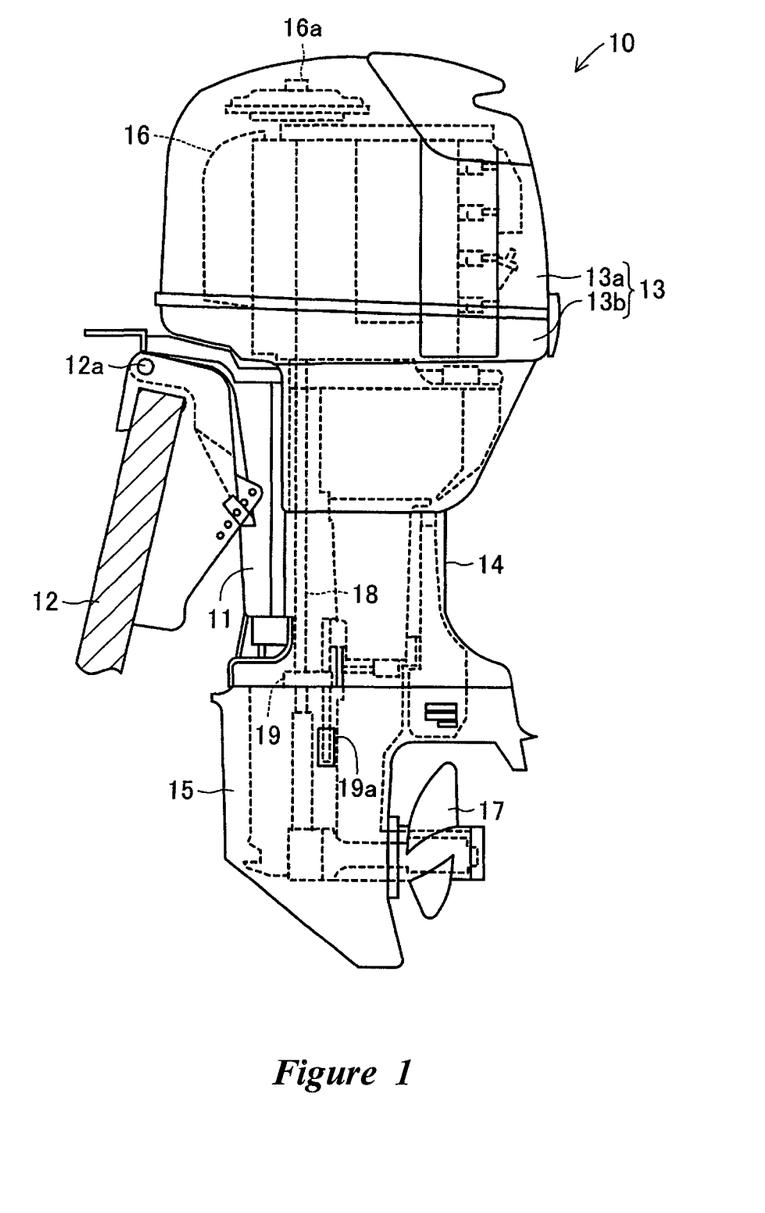
FIG. 1 is a side view of an outboard motor having a sealing structure using a metal gasket that is arranged and configured in accordance with certain features, aspects and advantages of an embodiment of the present invention.

With reference to FIG. 1, an outboard motor 10 that has a sealing structure arranged and configured in accordance with certain features, aspects and advantages of an embodiment of the present invention is described below. The sealing structure, however, may also be used for other vehicles, and particularly, other watercraft, including but not limited to, small planing boats having inboard engines.

The outboard motor 10 comprises a swivel bracket 11 and a clamp bracket 12 that is connected to the swivel bracket 11 to support the outboard motor 10. The swivel bracket 11 is connected to a steering shaft (not shown) that is rotatable about an approximately vertical axis when the outboard motor is in an operational position. The swivel bracket 11 is connected approximately to the center of the front (i.e., the front side in the forward drive direction of the boat) of the outboard motor 10 through the steering shaft.

Thus, the outboard motor 10 can rotate relative to the swivel bracket 11 on the horizontal plane. The clamp bracket 12 can be removably mounted on a stern (not shown) of the hull. The upper end of the swivel bracket 11 can be connected to the upper end of the clamp bracket 12 via a tilt shaft 12a. More specifically, the clamp bracket 12 comprises a pair of members that are spaced apart by a given distance in a lateral direction of the hull. The tilt shaft 12a extends horizontally across the pair of the members of the clamp bracket 12 on the upper end thereof. The upper end of the swivel bracket 11 is mounted on the tilt shaft 12a between the paired members of the clamp bracket 12 such that the upper end of the swivel bracket rotates in the axial direction of the tilt shaft 12a.

A housing that forms an external surface of the outboard motor 10 comprises a cowling 13 having a top and a bottom cowl 13a and 13b with the cowling forming an upper part of the housing, an upper case 14 forming a middle part of the housing, and a lower case 15 forming a lower part of the housing. An engine 16 is housed within the cowling 13 while a propeller 17 is provided adjacent to the lower case 15. A power transmission mechanism, including a drive shaft 18 that transmits a driving force from the engine 16 to the propeller 17, is housed within the upper case 14.

The engine 16 is a water-cooled three-cylinder engine in which a crankshaft 16a extends generally in the vertical direction. The drive shaft 18 is connected at the bottom end of the crankshaft 16a. Thus, when the engine 16 operates, the crankshaft 16a rotates and the rotation of the crankshaft is transmitted to the propeller 17 through the drive shaft 18. The rotation of the propeller 17 produces a propulsion force. In one configuration, the cooling water pump 19 is installed at the bottom end of the upper case 14. A water intake 19a can be provided in the lower case 15 for introducing cooling water (seawater). The cooling water pump 19 is designed to introduce cooling water from the water intake 19a during its operation and to feed the cooling water to the engine 16 for cooling.

Figure 2:
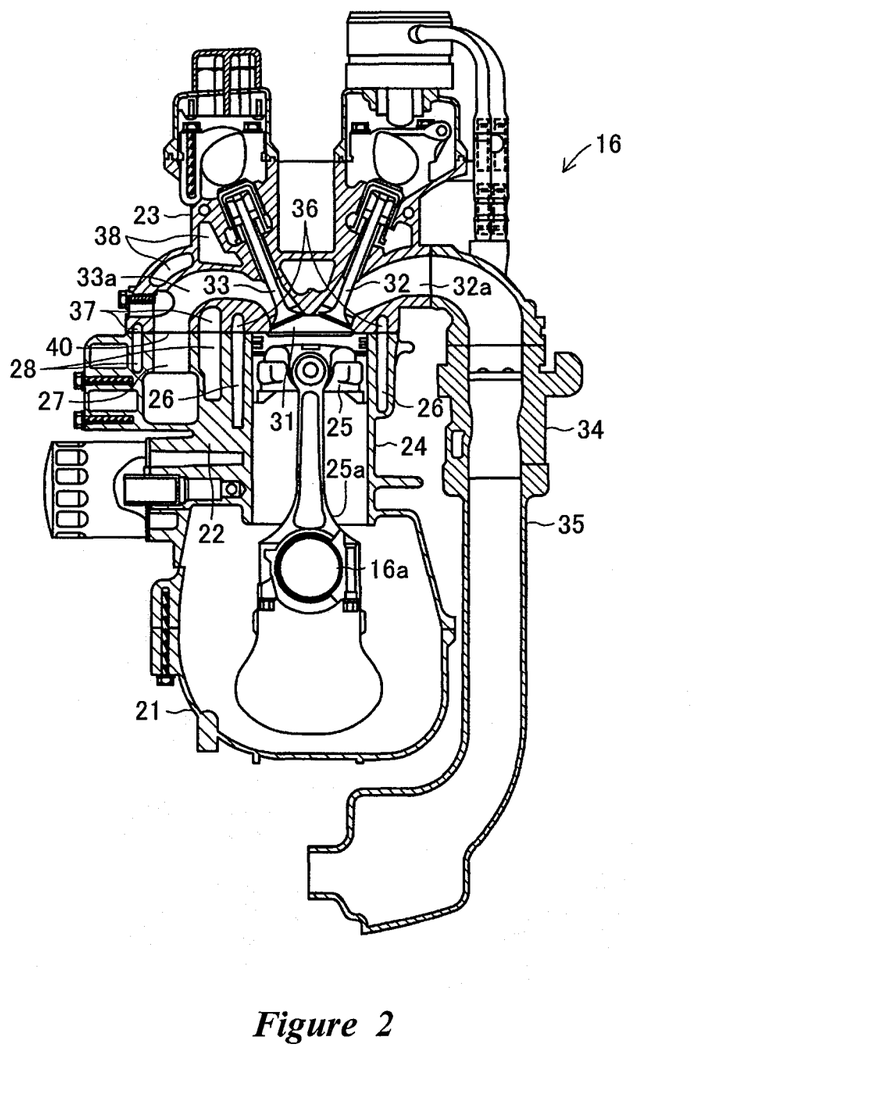
FIG. 2 is a sectional view of an engine used in the outboard motor of FIG. 1.

With reference now to FIG. 2, the outer shell, which defines the main body of the engine 16, comprises a crankcase 21 that houses the crankshaft 16a. The main body of the engine 16 also comprises the cylinder body 22 and the cylinder head 23 with the cylinder body 22 positioned generally between the cylinder head 23 and the crankcase 21. The main body of the engine 16 preferably is made of aluminum. In approximately a middle of the interior of the cylinder body 22, three cylinders 24 (only one cylinder is shown) are aligned and each cylinder 24 preferably comprises a bore that defines a recess. A connecting rod 25a connects a piston 25 to the crankshaft 16a. Each piston 25 can be housed inside a respective cylinder 24 with the piston 25 being capable of translating movement inside the bore. The translating movement of the piston 25 is transmitted to the crankshaft 16a through the connecting rods 25a such that the crankshaft 16a rotates due to the translation of the piston 25.

A cooling water passage 26 is formed around the cylinders 24 on the upper side of the cylinder body 22. In the cylinder body 22, an exhaust passage 27 is formed outside of one side (left side in FIG. 2) of the cooling water passage 26. In turn, a cooling water passage 28 is formed around the exhaust passage 27. Three combustion chambers 31 (only one chamber is shown), each communicating with the respective cylinders 24, are formed on the bottom center (in the orientation shown in FIG. 2) of the cylinder head 23. An intake valve 32 and an exhaust valve 33 are provided on the top of each combustion chamber 31. An intake port 32a communicating with the intake valve 32 of each cylinder 24 is connected to an intake system including a carburetor 34, an intake pipe 35 and other components. An exhaust port 33a communicating with the exhaust valve 33 is connected to an exhaust system including an exhaust passage 27 and other components.

The intake valve 32 is open during the intake stroke to feed an air-fuel mixture formed of air supplied through the intake system and fuel supplied from a fuel tank (not shown) to the interior of the cylinder 24. The exhaust valve 33 is open during the exhaust stroke such that the exhaust gas can be evacuated from the cylinder 24 to the exhaust system. The engine 16 is provided with an ignition device (not shown), and a spark generated by the ignition device ignites the mixture for an explosion. The explosion causes the piston 25 to move up and down, thereby rotating the crankshaft 16a.

In a bottom area of the cylinder head 23 opposing the cooling water passage 26, a cooling water passage 36 is formed that communicates with the cooling water passage 26. In another bottom area of the cylinder head 23 opposing the cooling water passage 28, a cooling water passage 37 is formed that communicates with the coolant water passage 28. Further, a cooling water passage 38 is formed on one of the outer sides of the exhaust valve 33 in the cylinder head 23. In one configuration, these cooling water passages 26, 28, 36, 37, and 38 all communicate with each other, defining a single flow channel. Operation of the cooling water pump 19 causes the cooling water to be introduced from the water intake 19a and causes the cooling water to flow through the interior of the flow channel, thereby cooling the engine 16. An oil flow channel (not shown) for supplying lubricant to the engine 16 also can be formed in the main body of the engine 16.

With reference still to FIG. 2, a metal gasket 40 preferably is installed on the mating face between the cylinder body 22 and the cylinder head 23. In one configuration, the metal gasket 40 is constructed as shown in the plan view of FIG. 3. Bores 41a, 41b, and 41c are formed corresponding to the three cylinders 24. The size of each bore preferably is generally equal to the size of the bore of each cylinder 24 and the axial location of each bore 41a, 41b, 41c preferably aligns with the axis of each of the corresponding cylinders 24. The illustrated metal gasket 40 preferably also has an exhaust gas hole 42 that is formed on an area corresponding to the exhaust passage 27 with the size, shape and position of the exhaust gas hole 42 being generally the same as the size, shape and position of the exhaust passage 27.

Figure 3:
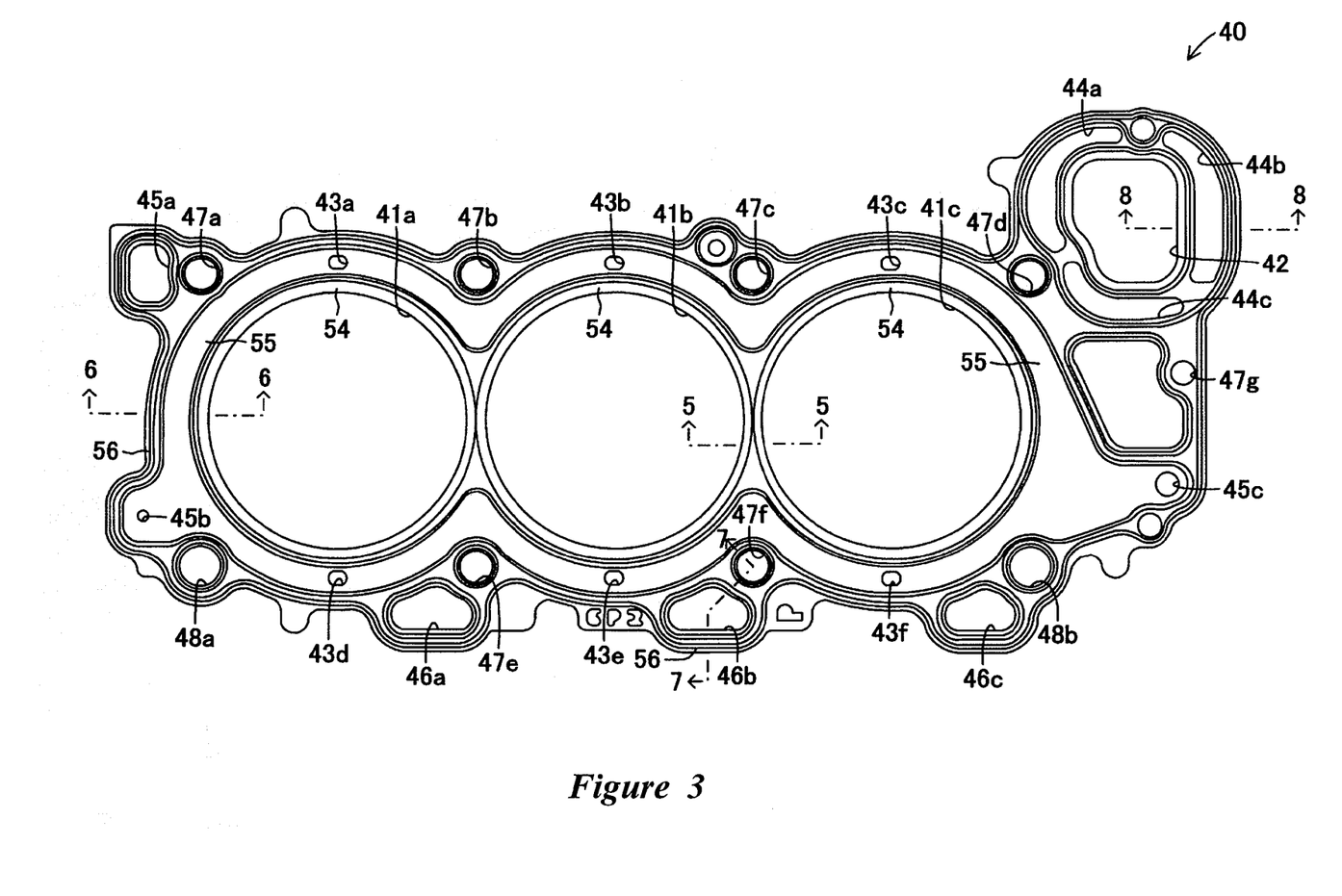
FIG. 3 is a plan view of the metal gasket used in the engine of FIG. 2.

The metal gasket 40 also preferably has small oval-shaped cooling water holes 43a, 43b, 43c, 43d, 43e, and 43f that are formed in sizes, shapes and locations that generally correspond to the cooling water passages 26, 36 that are formed around the periphery of the bores defining the cylinders 24. In other words, the cooling water holes 43a, 43b, 43c, 43d, 43e, and 43f are positioned around the periphery of the bores 41a, 41b and 41c. The metal gasket 40 preferably comprises approximately arc-shaped elongated cooling water holes 44a, 44b, and 44c that are spaced apart from each other around a periphery of the exhaust gas hole 42 and that correspond to the cooling water passages 28 and 37. Further, cooling water holes 45a, 45b, and 45c having different shapes can be formed at the respective corners of the metal gasket 40, with the exclusion in the illustrated configuration of the corner where the exhaust gas hole 42 exists.

In addition, the illustrated metal gasket 40 has three oil holes 46a, 46b, and 46c which are approximately triangular in shape and which generally correspond to the oil flow channel. Further, the illustrated metal gasket 40 also has six bolt holes 47a, 47b, 47c, 47d, 47e, 47f, and 47g that generally correspond to the location of respective bolts used to secure the cylinder head to the cylinder body and that are positioned so as to not intersect with the cooling water passages 26 and 36.

Two through holes 48a and 48b can be formed at the interval approximately equal to the interval between the bolt holes 47e and 47f on the outsides of the bolt holes 47e and 47f such that the bolt holes 47e and 47f are interposed between the through holes 48a and 48b. The bolt holes 47a, 47b, 47c, 47d, 47e, 47f, and 47g are designed to allow a bolt (not shown) used to connect the cylinder body 22 and the cylinder head 23 to be inserted therethrough. The through holes 48a and 48b are designed to allow a positioning pin (not shown) for generally aligning the cylinder body 22 and the cylinder head 23 to be inserted therethrough.

Figure 4:
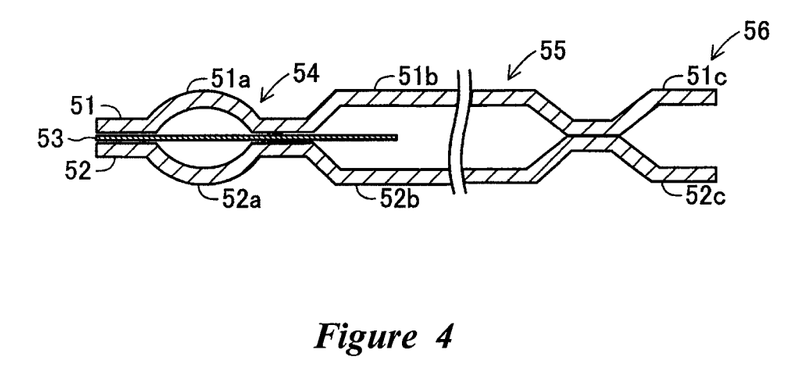
FIG. 4 is a sectional view of the metal gasket used in the engine of FIG. 2.

As shown in FIG. 4, the metal gasket 40 preferably is formed by interposing a thin-plate shim member 53, which defines an inner member, at a desired location between thin bead plates 51, 52 that are arranged in layers. The bead plates 51, 52 and the shim member 53 can be made of stainless steel with each having a rubber coating layer (not shown) or the like formed on the surface. In one configuration, the bead plates 51, 52 have a predetermined thickness of approximately 0.2 mm while the shim member 53 has a predetermined thickness of approximately 0.1 mm.

The bead plates 51, 52 preferably are vertical symmetrical (i.e., the top and bottom in FIG. 4). In one configuration, the bead plate 51 has protrusions 51a, 51b, 51c that extend upward at desired locations. The bead plate 52 has protrusions 52a, 52b, 52c that extend downward at desired locations. Preferably, each of the protrusions 51a, 52a is shaped into a curved surface while each of protrusions 51b, 51c, 52b, 52c is each shaped into a table or plateau shape having a bent portion. The protrusions 51a, 52a and the shim member 53 located within the protrusions 51a, 52a preferably define a primary bead 54. The protrusions 51b, 52b and a part of the shim member 53 located within the protrusions 51b, 52b preferably define a secondary bead 55. Also, the protrusions 51c, 52c preferably define a half bead 56 having an open end.

Figure 5:
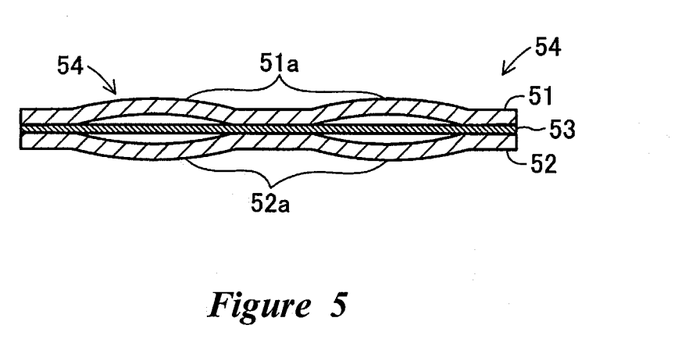
FIG. 5 is a sectional view taken along the line 5-5 of FIG. 3.
Figure 6:
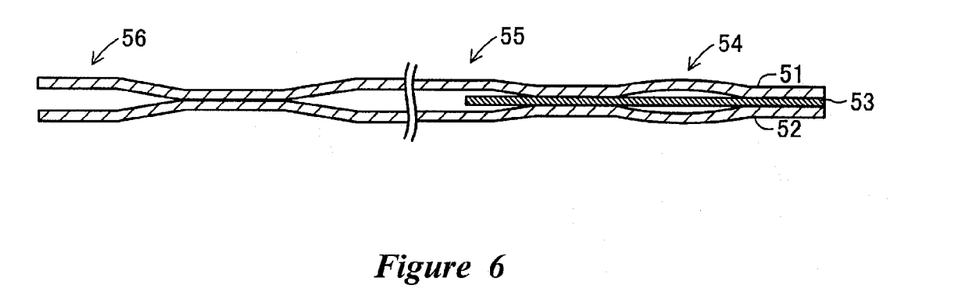
FIG. 6 is a sectional view taken along the line 6-6 of FIG. 3.
Figure 7:
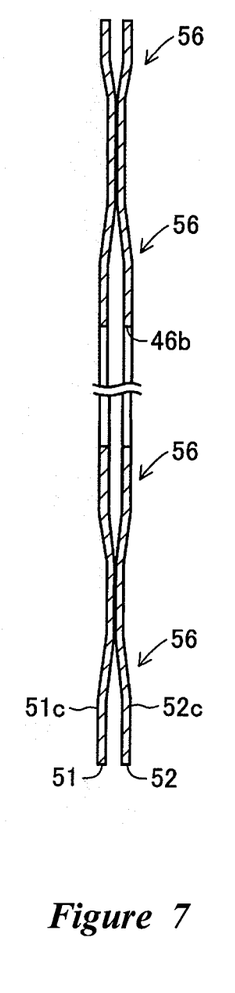
FIG. 7 is a sectional view taken along the line 7-7 of FIG. 3.
Figure 8:
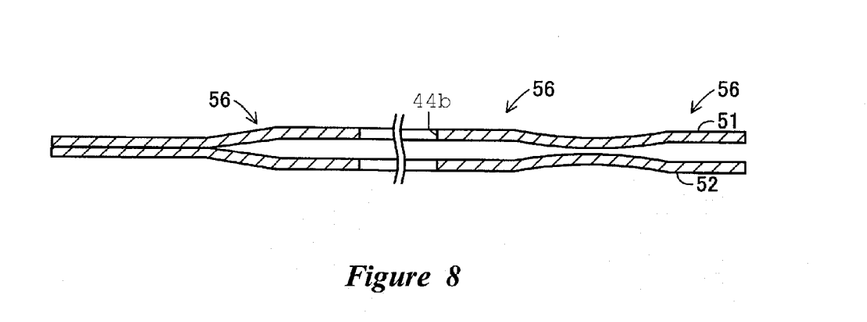
FIG. 8 is a sectional view taken along the line 8-8 of FIG. 3.

As shown in FIG. 3, the primary bead 54, the secondary bead 55 and the half bead 56 preferably are formed in multiple areas of the metal gasket 40. More specifically, FIG. 5 is a sectional view taken along the line 5-5 of FIG. 3 (primary bead 54); FIG. 6 is a sectional view taken along the line 6-6 of FIG. 3 (primary bead 54, secondary bead 55 and half bead 56); FIG. 7 is a sectional view taken along the line 7-7 of FIG. 3 (half bead 56); and FIG. 8 is a sectional view taken along the line 8-8 of FIG. 3 (half bead 56).

As shown in FIG. 5, the primary bead 54, in which the shim member 53 is interposed between the protrusions 51a, 52a, is formed on an area around the peripheries of the bores 41a, 41b, and 41c. Thus, the primary bead 54 can circumscribe the openings for the cylinder bores.

Figure 9:
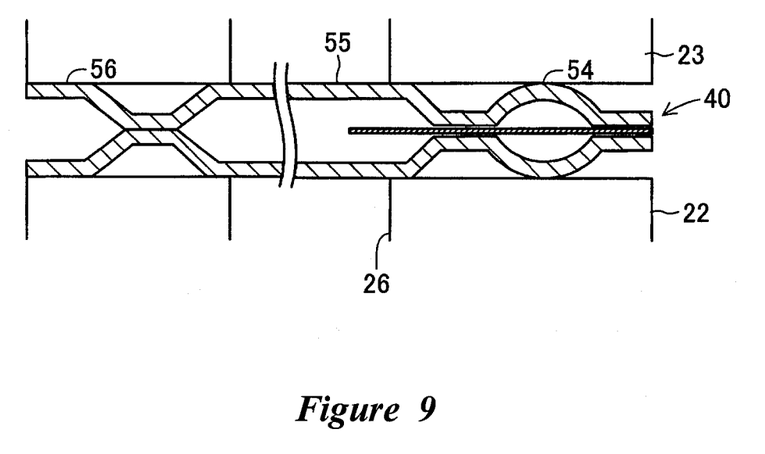
FIG. 9 is a sectional view of the metal gasket installed between the cylinder body and the cylinder head.

As shown in FIG. 6, the metal gasket 40, on an area defined between each of the bores 41a, 41b, 41c and the periphery of the metal gasket 40, comprises the primary bead 54, the secondary bead 55 and the half bead 56 formed in order from the bores 41a, 41b, 41c to the periphery of the metal gasket 40. In the illustrated configuration, as shown in FIG. 9, the secondary bead 55 preferably extends from an area of the metal gasket 40 corresponding to the cooling water passages 26, 36 to areas on the opposite sides of the cooling water passages 26, 36 (i.e., the edge of the openings 26, 36 where they extend through the mating faces of the cylinder head and the cylinder body). Preferably, the half bead 56 is disposed with its open end aligned with the outer edge of the mating face between the cylinder body 22 and the cylinder head 23.

Figure 10:
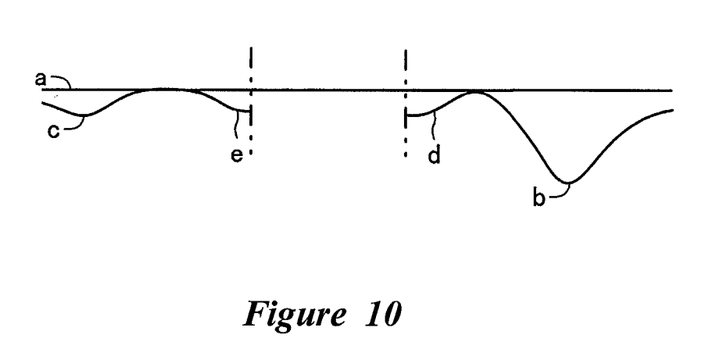
FIG. 10 is a graphical depiction that represents a surface pressure of the respective components shown in FIG. 9.

FIG. 10 represents a surface pressure exerted on the mating face between the cylinder body 22 and the cylinder head 23 when the primary bead 54, the secondary bead 55 and the half bead 56 are used. In FIG. 10, the lateral direction along a straight line (a) represents the respective areas of the metal gasket 40, while the vertical direction perpendicular to the straight line (a) represents surface pressures of the respective areas. On the straight line (a), the surface pressure is "0." The surface pressure is larger in an area protruding more downward from the straight line (a). The larger surface pressure area has better sealability. In accordance with FIG. 10, a larger peak (b) of the surface pressure appears on the area of the primary bead 54, and a peak (c) smaller than the peak (b) appears on the area of the half bead 56. Further, small peaks (d) and (e) appear on the respective areas corresponding to the periphery of the cooling water passages 26 and 36 on the opposite sides.

Figure 11:
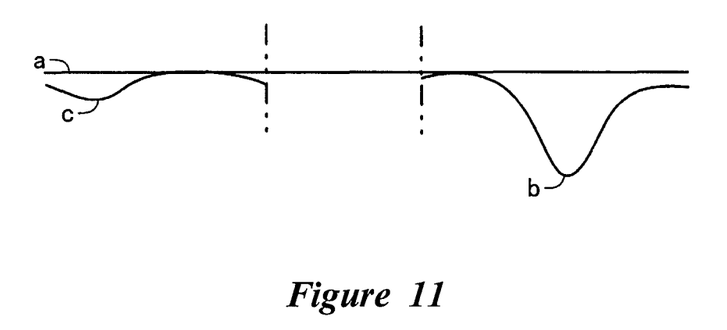
FIG. 11 is a graphical depiction that represents a surface pressure of the respective components in the conventional art.

FIG. 11 is provided for reference purpose, showing the surface pressure exerted on the mating face between the cylinder body 22 and the cylinder head 23 when the conventional metal gasket is used that is generally the same as the metal gasket 40 without a secondary bead 55. In this case, similar to FIG. 10, a larger peak (b) of the surface pressure appears on the area of the main bead 54, while a peak (c) smaller than the peak (b) appears on the area of the half bead 56. However, no peak of the surface pressure appears on the areas corresponding to the periphery of the cooling water passages 26 and 36 on the opposite sides, except a contact pressure with the edge. It can be seen from the measurement results that providing the secondary bead 55 on the metal gasket 40 helps to exert a greater surface pressure on areas adjacent to the periphery of the cooling water passages 26, 36 on the opposite sides on the mating face between the cylinder body 22 and the cylinder head 23; cooling water thus is less likely to enter into the mating face between the cylinder body 22 and the cylinder head 23.

With reference to FIG. 7, four half beads 56 can alternate between the periphery of the metal gasket 40 through the oil hole 46b to the inner periphery of the bolt hole 47f. More specifically, in the illustrated configuration, each half bead 56 can be disposed such that its open end is positioned respectively at the periphery of the metal gasket 40, the oil hole 46b and the inner periphery of the bolt hole 47f.

As shown in FIG. 8, three half beads 56 can alternate in opposite directions where the gasket 40 extends from the inner periphery of the exhaust gas hole 42, through the cooling water hole 44b and to the outer periphery of the metal gasket 40. In this case, each half bead 56 can be disposed such that its open end is positioned respectively at the periphery of the metal gasket 40 and the inner periphery of the cooling water hole 44b. The joined portion of the bead plates 51, 52 can be positioned in an area of the metal gasket 40 that corresponds to the inner periphery of the gas hole 42.

As described above, the metal gasket 40 preferably has the primary bead 54 formed on an area corresponding to the middle between the bores 41a, 41b, 41c where the highest sealability is desired and at the cooling water passages 26, 36. This configuration reduces the likelihood of cooling water in the cooling water passages 26, 36 entering through the mating face between the cylinder body 22 and the cylinder head 23 toward the bores 41a, 41b, 41c.

Further, the metal gasket 40 has the secondary bead 55 extending from an area corresponding to the cooling water passages 26, 36 to areas on the opposite sides of the cooling water passages 26, 36 (i.e., the inner edge sides of the mating face between the cylinder body 22 and the cylinder head 23). This reduces the likelihood of the cooling water entering into the mating face between the cylinder body 22 and the cylinder head 23. Further, the metal gasket 40 has the half bead 56 formed on another area where sealability is desired. Thus, sealability appropriate to the respective areas can be achieved.

As described above, the metal gasket 40 not only has the primary bead 54 that is formed on an area corresponding to the middle portion disposed between the bores 41a, 41b, 41c and the cooling water passages 26, 36, but also the secondary bead 55 that is formed on an area corresponding to an edge defining the opening of the cooling water passages 26, 36. Thus, the surface pressure increases on the edge that defines the opening of the cooling water passages 26, 36, which reduces the likelihood that cooling water will enter into the mating face between the cylinder body 22 and the cylinder head 23.

The metal gasket 40 can be made from a stainless steel thin-plate base member with a rubber coating layer formed on its surface. Thus, the metal gasket 40 can reduce the likelihood of entry of seawater or other coolant into the mating face between the cylinder body 22 and the cylinder head 23 as a result of scratches found on the mating face. Further, the primary bead 54 is formed by the two bead plates 51, 52 as well as the shim member 53 disposed between the bead plates 51, 52. Also, the primary bead 54 is formed by defining a space respectively between the bead plates 51 and 52 and the shim member 53. Therefore, the surface pressure increases on the area corresponding to the primary bead 54 on the mating face between the cylinder body 22 and the cylinder head 23, which improves the sealing ability in the regions of the bores 41a, 41b, 41c and the cooling water passages 26, 36.

Further, the secondary bead 55 can be formed by defining a space on a given area between the two bead plates 51, 52. Thus, the surface pressure increases on an area corresponding to the border of the mating face between the cylinder body 22 and the cylinder head 23 in the region of the cooling water passages 26 and 36. This can reduce the likelihood of cooling water flowing through the cooling water passages 26 and 36 entering into the mating face between the cylinder body 22 and the cylinder head 23.

The primary and secondary beads of the metal gasket, within which the respective spaces are formed, preferably function as a spring or a cushion. Thus, the surface pressure that is exerted by the metal gasket increases, which results in better sealing of the mating faces between the cylinder head and the cylinder body. In addition, the primary bead includes two bead plates and the inner member, which ensures better sealing between the cylinder forming recesses and the cooling water passage. In an area of the metal gasket where the secondary bead exists, the inner member may be provided in order to reinforce the secondary bead, although the inner member is not always needed.

Figure 12:
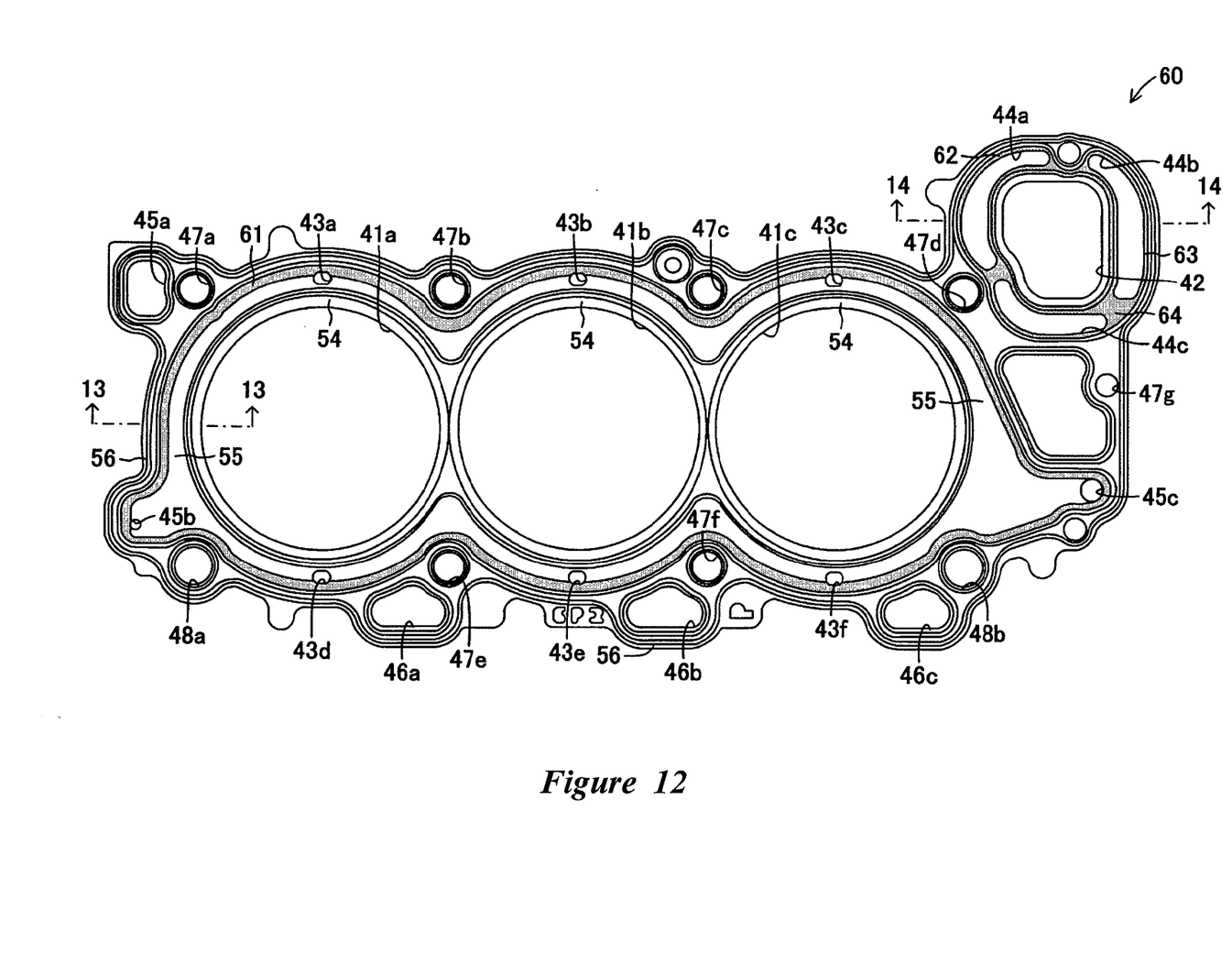
FIG. 12 is a plan view of a metal gasket that is arranged and configured in accordance with certain features, aspects and advantages of another embodiment of the present invention.

FIG. 12 illustrates another metal gasket 60 that is arranged and configured in accordance with certain features, aspects and advantages of an embodiment of the present invention. The metal gasket 60, which is generally the same as the metal gasket 40, has certain areas on the front and back surfaces to which a gap filler is applied. Thus, components common to the metal gasket 40 are denoted by the same reference numeral and the description thereof is not repeated. In the illustrated configuration, the metal gasket 60 has a gap filling layer 61 disposed respectively on the front and back surfaces at the border of the mating face between the cylinder body 22 and the cylinder head 23 and the cooling water passages 26, 36 and at areas adjacent to the border (the gap filling layer on the back surface is not shown) such that the gap filling layer 61 surrounds the cooling water passages 26 and 36.

The illustrated metal gasket 60 also has gap filling layers 62, 63, 64 formed respectively on the front and back surfaces at borders of the mating face between the cylinder body 22 and the cylinder head 23 and the cooling water holes 44a, 44b, 44c and at areas adjacent to the borders (the gap filling layers on the back surface are not shown) such that the gap filling layers 62, 63, 64 surround the cooling water holes 44a, 44b, 44c.

Figure 13:
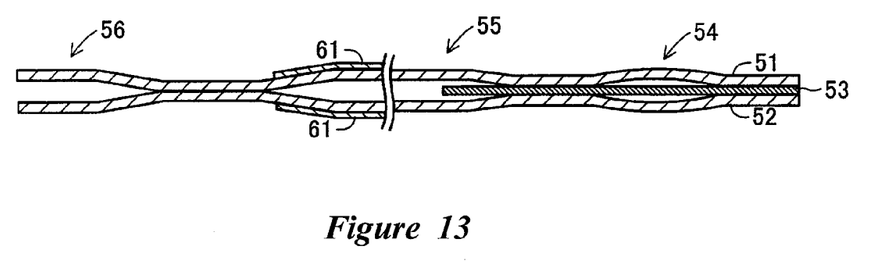
FIG. 13 is a sectional view taken along the line 13-13 of FIG. 12.
Figure 14:
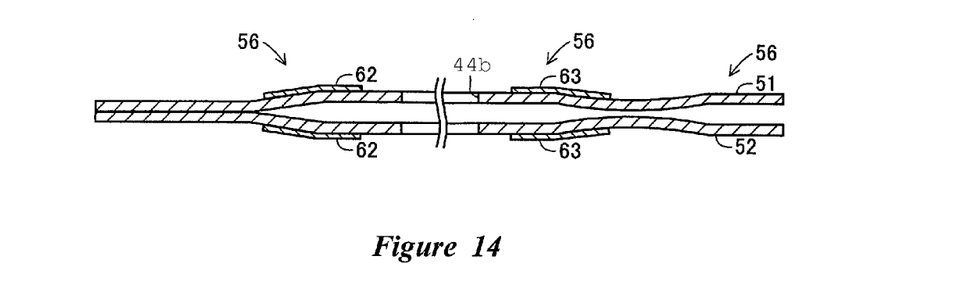
FIG. 14 is a sectional view taken along the line 14-14 of FIG. 12.

FIG. 13 illustrates a sectional view taken along the line 13-13 of FIG. 12. FIG. 14 illustrates a sectional view taken along the line 14-14 of FIG. 12. To be more specific, the gap filling layers 61, 62, 63, 64 are formed on the respective surfaces of the secondary bead 55 or the half bead 56. Thus, the mating face between the cylinder body 22 and the cylinder head 23, and the secondary bead 55 or the half bead 56, which contacts the mating face through the gap filing layers 61, 62, 63, 64, are brought into tighter contact with each other, resulting in higher sealability by the metal gasket 60. Moreover, in the event that the rigidity of the engine can cause a gap on the mating face between the cylinder head and the cylinder body, the beads provided to the metal gasket may not be sufficient enough in all situations to prevent entry of the cooling water into the mating face. Thus, the gap filler can further reduce the likelihood of cooling water entering. The functions and effects of the metal gasket 60, other than those described above, are generally the same as in the case with the metal gasket 40 according to the aforementioned embodiment.

Although the present invention has been described in terms of certain embodiments, other embodiments apparent to those of ordinary skill in the art also are within the scope of this invention. For example, in the aforementioned embodiments, the secondary beads 55, 75 comprise left and right long protrusions 51b, 51b, or protrusions 71b, 71b, and an inner plate 73. However, the secondary bead 55 may be short and can be formed on one of the sides of the cooling water passages 26 and 36. In short, the secondary bead 55 may be formed on any area corresponding to the border of the mating face between the cylinder body 22 and the cylinder head 23 and the cooling water passages 26, 36. Further, the layout, structure and materials of the components in the sealing structure using the metal gasket may be modified as appropriate within the technical scope of the invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A metal gasket for sealing an interface between a cylinder head and a cylinder body of an engine body, the metal gasket comprising:
   first and second bead plates, each of the first and second bead plates including:
   a plurality of primary beads arranged to protrude outward;
   a secondary bead arranged to protrude outward, the secondary bead including an inner side adjacent to the plurality of primary beads and an outer side spaced from the inner side;
   a plurality of cylinder openings;
   a plurality of cooling water holes;
   an exhaust gas hole; and
   a plurality of exhaust cooling water holes arranged around the exhaust gas hole, wherein the plurality of cylinder openings are arranged in a row and the exhaust gas hole is offset from the row of the plurality of cylinder openings; and an inner member disposed between at least a portion of the first and second bead plates, the plurality of primary beads are defined by the first and second bead plates and the inner member disposed between the first and second bead plates, and the secondary bead is defined by the first and second bead plates and partially by the inner member such that the inner member is located at an inner side of the secondary bead that is adjacent to the plurality of primary beads but only the first and second bead plates and not the inner member are located at an outer side of the secondary bead; wherein the plurality of primary beads are full beads arranged adjacent to a periphery of the plurality of cylinder openings, respectively;

the secondary bead is positioned on an opposite side of the plurality of primary beads from the plurality of cylinder openings;

the secondary bead surrounds all of the plurality of primary beads;

the secondary bead has a plateau shape including a plateau portion and bent portions extending to the plateau portion, the plateau portion of the secondary bead defines an outermost layer of the metal gasket, and the plurality of cooling water holes are located in the plateau portion of the secondary bead between the inner side and the outer side of the secondary bead; and the metal gasket includes three half beads arranged between the exhaust gas hole and an outer periphery of the metal gasket, a first of the three half beads is disposed such that an open end of the first half bead is positioned at the outer periphery of the metal gasket, and a second and a third of the three half beads are positioned such that open ends of the second and third half beads are positioned at an inner periphery of at least one of the plurality of exhaust cooling water holes.

2. The metal gasket of claim 1, wherein each of the plurality of primary beads and the secondary bead is left-right symmetrical about a vertical line extending through a center of the plurality of primary beads and the secondary bead, respectively.

3. The metal gasket of claim 1, wherein each of the plurality of primary beads and the secondary bead is top-bottom symmetrical about a horizontal line extending between the first and second bead plates.

4. The metal gasket of claim 1, wherein the inner member is made of stainless steel and includes a rubber coating layer provided on at least one of its surfaces.

5. The metal gasket of claim 4, wherein a gap filler is arranged on at least a portion of an outermost surface of at least one of the first and second bead plates at a location corresponding to the secondary bead so as to protrude from the outermost surface of the at least one of the first and second bead plates.

6. The metal gasket of claim 1, wherein a gap filler is arranged on at least a portion of an outermost surface of at least one of the first and second bead plates at a location corresponding to the secondary bead so as to protrude from the outermost surface of the at least one of the first and second bead plates.

7. The metal gasket of claim 1, wherein the plurality of exhaust cooling water holes have a different shape than the plurality of cooling water holes.

8. The metal gasket of claim 7, further comprising a plurality of oil holes, wherein the plurality of oil holes have a different shape than the plurality of cooling water holes and the plurality of exhaust cooling water holes.

9. An engine including the metal gasket of claim 1.

10. An outboard motor including the engine of claim 9.

* * * * *